US010977587B2

(12) United States Patent
Khalili (10) Patent No.: US 10,977,587 B2
(45) Date of Patent: Apr. 13, 2021

(54) SYSTEM AND METHOD FOR PROVIDING IMPACT MODELING AND PREDICTION OF ATTACKS ON CYBER TARGETS

(75) Inventor: Aram Edgar Khalili, Austin, TX (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 1200 days.

(21) Appl. No.: 13/695,611

(22) PCT Filed: Mar. 31, 2011

(86) PCT No.: PCT/US2011/030813
§ 371 (c)(1),
(2), (4) Date: Oct. 31, 2012

(87) PCT Pub. No.: WO2011/162848
PCT Pub. Date: Dec. 29, 2011

(65) Prior Publication Data
US 2013/0055404 A1 Feb. 28, 2013

Related U.S. Application Data (60) Provisional application No. 61/319,947, filed on Apr. 1, 2010.

(51) Int. Cl.
*G06Q 10/00* (2012.01)
*G06Q 10/06* (2012.01)
(Continued)

(52) U.S. Cl.
CPC ............. *G06Q 10/06* (2013.01); *G06Q 10/00* (2013.01); *G06Q 10/063* (2013.01);
(Continued)

(58) Field of Classification Search
CPC ............... G06Q 10/063; G06Q 10/067; G06Q 10/0633; G06Q 10/06; G06Q 10/06312;
(Continued)

(56) References Cited

U.S. PATENT DOCUMENTS 5,850,516 A * 12/1998 Schneier ................. G06F 21/57
726/25
6,718,535 B1 * 4/2004 Underwood ............ G06F 9/451
717/101
(Continued)

OTHER PUBLICATIONS

"The Use of Attack and Protection Trees to Analyze Security for an Online Banking System"; Proceedings of the 40th Annual Hawaii International Conference on System Sciences (HICSS'07), 2007; Kenneth Edge, Richard Raines, Michael Grimaila, and Rusty Baldwin, Air Force Institute of Technology Wright Patterson AFB, OH.*
(Continued)

*Primary Examiner* — Patrick McAtee
*Assistant Examiner* — Edgar R Martinez-Hernandez
(74) *Attorney, Agent, or Firm* — Katten Muchin Rosenman LLP (57) ABSTRACT

Embodiments of a system and method are disclosed to provide impact modeling and prediction of attacks on cyber targets (IMPACT). An embodiment of the system and method creates a network model to describe the IT resources of an organization, creates a business model to describe the origination's mission, and creates a correlation model that correlates the network model and the business model to describe how the origination's mission relies on the IT resources. Proper analysis may show which cyber resources are of tactical importance in a cyber attack. Such analysis also reveals which IT resources contribute most to the organization's mission. These results may then be used to formulate IT security strategies and explore their trade-offs, which leads to better incident response.

20 Claims, 5 Drawing Sheets (51) Int. Cl.
  *H04L 12/24* (2006.01)
  *H04L 29/06* (2006.01)
(52) U.S. Cl.
  CPC ....... *G06Q 10/067* (2013.01); *G06Q 10/0635* (2013.01); *G06Q 10/06312* (2013.01); *G06Q 10/06375* (2013.01); *H04L 41/14* (2013.01); *H04L 41/145* (2013.01); *H04L 63/14* (2013.01); *H04L 63/1433* (2013.01); *H04L 63/1441* (2013.01)
(58) Field of Classification Search
  CPC .......... G06Q 10/06375; G06Q 10/0635; H04L 63/1433; H04L 67/10; H04L 41/14; H04L 41/145; H04L 63/14; H04L 63/1441
  USPC .... 705/11, 348, 7.11, 7.22, 7.27; 726/11, 25
  See application file for complete search history.

(56) References Cited

U.S. PATENT DOCUMENTS

| | | | | |
|---|---|---|---|---|
| 7,865,383 B2* | 1/2011 | Tafoya | ................... | G06Q 10/06 705/7.36 |
| 8,046,835 B2* | 10/2011 | Herz | ................... | G06Q 20/201 726/25 |
| 8,176,527 B1* | 5/2012 | Njemanze | ............. | G06Q 10/06 726/2 |
| 8,191,139 B2* | 5/2012 | Heimerdinger | ..... | H04L 63/1441 726/22 |
| 8,266,277 B2* | 9/2012 | Duggan | ................. | G06F 9/5011 709/224 |
| 8,464,346 B2* | 6/2013 | Barai | ................. | H04L 63/1433 380/200 |
| 8,516,596 B2* | 8/2013 | Sandoval | ............. | G06F 21/554 726/25 |
| 8,677,486 B2* | 3/2014 | Olney | ................... | G06F 21/564 726/23 |
| 8,768,750 B2* | 7/2014 | Clark | ................... | G06Q 10/063 705/7.39 |
| 2004/0059611 A1* | 3/2004 | Kananghinis | .......... | G06Q 10/06 705/325 |
| 2006/0117388 A1* | 6/2006 | Nelson | ................. | G06F 11/008 726/25 |
| 2006/0156108 A1 | 7/2006 | Hinberger et al. | | |
| 2006/0156408 A1* | 7/2006 | Himberger | ............. | G06Q 40/08 726/25 |
| 2008/0005555 A1* | 1/2008 | Lotem | ................... | G06F 21/55 713/150 |
| 2008/0034425 A1* | 2/2008 | Overcash | ................ | G06F 21/55 726/22 |
| 2008/0312980 A1* | 12/2008 | Boulineau | .............. | G06Q 10/06 705/7.13 |
| 2009/0083695 A1* | 3/2009 | Mir | ........................ | G06Q 10/06 717/104 |
| 2009/0113552 A1* | 4/2009 | Jin | ........................ | G06F 21/577 726/25 |
| 2009/0192867 A1* | 7/2009 | Farooq | ................... | G06Q 10/06 705/7.29 |
| 2009/0248586 A1* | 10/2009 | Kaisermayr | ........ | G06Q 30/0283 705/80 |
| 2009/0254572 A1* | 10/2009 | Redlich | ................... | G06Q 10/06 |
| 2009/0319316 A1* | 12/2009 | Westerfeld | ............. | G06Q 50/01 705/319 |
| 2010/0058456 A1* | 3/2010 | Jajodia | .................... | H04L 63/20 726/11 |
| 2010/0153156 A1* | 6/2010 | Guinta | ............... | G06Q 10/0635 705/7.28 |
| 2010/0332889 A1* | 12/2010 | Shneorson | ............. | G06Q 10/04 714/2 |
| 2012/0096558 A1* | 4/2012 | Evrard | ................... | G06F 21/577 726/25 |
| 2013/0019315 A1* | 1/2013 | Chen | ..................... | G06F 21/577 726/25 |
| 2013/0325147 A1* | 12/2013 | Karnouskos | ......... | G06Q 10/063 700/30 |
| 2014/0122138 A1* | 5/2014 | Gebhart | ................... | G06F 9/50 705/7.11 |

OTHER PUBLICATIONS

Stefan Axelsson; "Intrusion Detection Systems: A Survey and Taxonomy"; file: Intrusion_Detection_Systems-a_Survey_and_Taxonomy.pdf; Mar. 14, 2000 (Year: 2000).*
Prof. Denis R. Towill, F.Eng.; "System dynamics—background, methodology, and applications"; file: System_Dynamics-background_methodology_applications.pdf; Oct. 1993 (Year: 1993).*
Norman Schneidewind; "Metrics for Mitigating Cybersecurity Threats to Networks"; file: Metrics_for_Mitigating_Cybersecurity_Threats_to_Networks.pdf; Jan./Feb. 2010 (Year: 2010).*
Khalili et al., "Impact Modeling and Prediction of Attacks on Cyper Targets." [online] published Mar. 2010. [retrieved on Nov. 25, 2011] Retrieved from the internet,<URL: http://www.dtic.mil/cgi-bin/GetTRDoc?AD=AD517401&Location=U2&doc=GetTRDoc.pdf>.
PCT International Preliminary Report on Patentability for International Application No. PCT/US2011/30813 dated Sep. 21, 2012.
PCT International Search Report and Written Opinion for PCT/US2011/30813 dated Dec. 13, 2011.
Publication of the PCT International Search Report for PCT/US2011/30813 dated Dec. 29, 2011.

* cited by examiner

SYSTEM AND METHOD FOR PROVIDING IMPACT MODELING AND PREDICTION OF ATTACKS ON CYBER TARGETS

RELATED APPLICATION

This application is a National Phase application of PCT Application Serial No. PCT/US11/30813, filed Mar. 31, 2011, entitled "SYSTEM AND METHOD FOR PROVIDING IMPACT MODELING AND PREDICTION OF ATTACKS ON CYBER TARGETS," which claims priority of U.S. Provisional Application Ser. No. 61/319,947, entitled the same and filed Apr. 1, 2010, both of which are hereby incorporated by reference.

GOVERNMENT CONTRACT

This invention was made with government support under contract number FA8750-08-C-0168 awarded by the Office of the Secretary of Defense (OSD) and the Air Force Research Laboratory (AFRL) through a Small Business Innovative Research (SBIR) grant. The government has certain rights in the invention.

TECHNICAL FIELD

The technical field is information technology (IT) infrastructure risk analysis.

BACKGROUND

Cyber infrastructure and cyber warfare are increasingly important in modern societies. The cybercrime volume continues to increase, yet current techniques only have a basic understanding of the complexities and interconnections of cyber assets. Congress responded to this increase in cybercrime by passing the Cybersecurity Enhancement Act of 2010, H.R. 4061, 111th Congress, and the federal government's Department of Defense is creating a new cyber command. See Miles, D., "Gates Establishes New Cyber Subcommand," American Forces Press Service (Jun. 24, 2009); "24th Air Force activated, 2 units realign in joint ceremony," Air Force News Service (Aug. 18, 2009)."

What is needed is a system and method that improve cyber situational awareness and mission assurance by connecting information on cyber assets with their role in an organization's mission.

DESCRIPTION OF THE DRAWINGS

The detailed description will refer to the following drawings, wherein like numerals refer to like elements, and wherein.

DETAILED DESCRIPTION

Embodiments of a system and method are disclosed to provide impact modeling and prediction of attacks on cyber targets (IMPACT). Specifically, an embodiment of the system and method may improve cyber situational awareness and mission assurance by connecting information on cyber assets with their role in an organization's mission. Endsley describes a three level situational awareness framework. Level I is perception. Level II is comprehension. Level III is prediction. See Endsley, M. R., "Toward a theory of situation awareness in dynamic systems," in [Human Factors], 37, 32-64 (March 1995). An embodiment of the system and method for providing IMPACT may provide Level II (comprehension) and Level III (prediction) situational awareness.

Valuable tools and methods exist that give information technology (IT) administrators the ability to configure and audit their infrastructure and probe for vulnerabilities. However, many of these tools and methods work at a very detailed level, such as at an individual system or service level, and do not expose the implications of their findings. By linking the operation or mission of an organization with the cyber resources of the organization, an embodiment of the system and method for providing IMPACT may provide the ability to assess the mission risk of particular attacks and specific assets' value to completion of the mission.

For example, a printing business may use cyber resources to accomplish its mission. A list of their IT infrastructure vulnerabilities may give the business an idea of how much effort is necessary to address the problems. However, the list of vulnerabilities does not give an assessment of the mission risk while the infrastructure vulnerabilities are still in place. For instance, a list of vulnerabilities does not indicate whether the organization's Internet connection or accounting system is more valuable to the mission of the organization.

An embodiment of the system and method for providing IMPACT may unveil the dependence of an organization's mission on the IT infrastructure and/or different components of the IT infrastructure and its resources (also referred to as IT resources or cyber resources), which include computers (real and virtual, server and workstation), printers, routers, appliances, smart phones, and other resources that may be compromised by a cyber attack.

IT security has been extensively studied and many tools have been created to provide or enhance defensive capabilities. An embodiment of the system and method for providing IMPACT may work with some of these tools.

Intrusion detection is the practice of detecting malicious behavior (i.e., violation of security policy) in computer systems or networks. See Denning, D. E., "An intrusion-detection model," IEEE Transactions on Software Engineering 13, 222-232 (February 1987). Intrusion detection works at level I in Endsley's framework. An embodiment of the system and method for providing IMPACT may incorporate network status information from an intrusion detection system in its network model, thus providing current or near real-time awareness with its display and analysis of an evolving situation. A plugin application programming interface (API) may be included for this purpose.

Penetration testing is an authorized attempt to breach security policy in order to discover or verify vulnerabilities in an IT infrastructure. See Scarfone, K., Souppaya, M., Cody, A., and Orebaugh, A., [Technical Guide to Information Security Testing and Assessment], ch. 5, Special Publication 800-115, NIST (September 2008). The goal of penetration testing is usually to identify vulnerabilities so that they may be removed or mitigated. An embodiment of the system and method for providing IMPACT may simulate penetration testing in its network model. However, a simulation is only as good as its assumptions. In other words, an algorithm cannot find any vulnerabilities not in its network model, and hence cannot replace penetration testing as a security tool. To the contrary, penetration testing may be helpful in building a network model for the system and method for providing IMPACT, since penetration testing aims to find all its vulnerabilities.

Attack/Protection trees are a tool to evaluate different attack or protection methods with regard to a particular target or objective, and differentiate the methods with respect to success chance and resource cost. See e.g., Weiss, J. D., "A system security engineering process," in [Proceedings of the 14th National Computer Security Conference], 572-581 (1991); Schneier, B., "Modeling security threats," Dr. Dobb's Journal 24 (December 1999); Edge, K., Raines, R., Grimaila, M., Baldwin, R. Bennington. R., and Reuter. C., "The use of attack and protection trees to analyze security for an online banking system," in [Proceedings of the 40th Hawaii International Conference on System Sciences], 144b (January 2007). An attack tree represents an attack plan and all its possible intermediate steps. At the top of the tree is the ultimate goal or root goal. The children of a node are subgoals that enable completion of a parent goal.

The protection tree is the dual of the attack tree. For each attack tree node, there is a corresponding protection tree node that seeks to prevent the attack goal. When a number of subgoals are necessary to enable a particular goal, then the defender need only prevent any one of them. However, if any of a number of subgoals is sufficient to enable the parent goals, then the defender needs to prevent all of those subgoals simultaneously.

Attack trees relate the various possible ways of achieving a goal, and allow a comparison between them. Components of an attack tree goal include a probability of success, assessment of the impact on the target, and a resource cost. These values need to be known a priori for the leaves of an attack trees, though some may be propagated upwards to the other nodes in the tree, e.g., the cost and impact of a node reflect the cost and impact of the node's subgoals. Once all the probabilities have been assigned and costs and impacts are propagated up the tree, a cost factor may be calculated, which serves as a basis for comparison. The cost factor is an indicator of the degree of impact achieved for a certain cost at a particular success probability. The path (or multi-path) from a leaf (or leaves) to the root that has the highest cost factor sum indicates the path that provides the most impact for a given cost. Protection trees have cost factors as well, and similar to an attack tree, a protection tree may be used to identify the tactics for a defender to achieve maximal protection value.

An embodiment of the system and method for providing IMPACT and protection trees may benefit each other in multiple ways. Protection trees need to be created from different attack paths that make up the tree. An embodiment of the system and method for providing IMPACT may find attack paths through a network and may be used to construct protection trees. Protection trees need an assessment of the impact of a successful attack on an organization. An embodiment of the system and method for providing IMPACT may provide such an assessment. An embodiment of the system and method for providing IMPACT may provide decision support on allocating defensive priorities and resources, and may provide a qualitative result (such as a priority list). Combining the system and method for providing IMPACT with protection trees may provide a quantitative cost versus benefit analysis.

Figure 1:
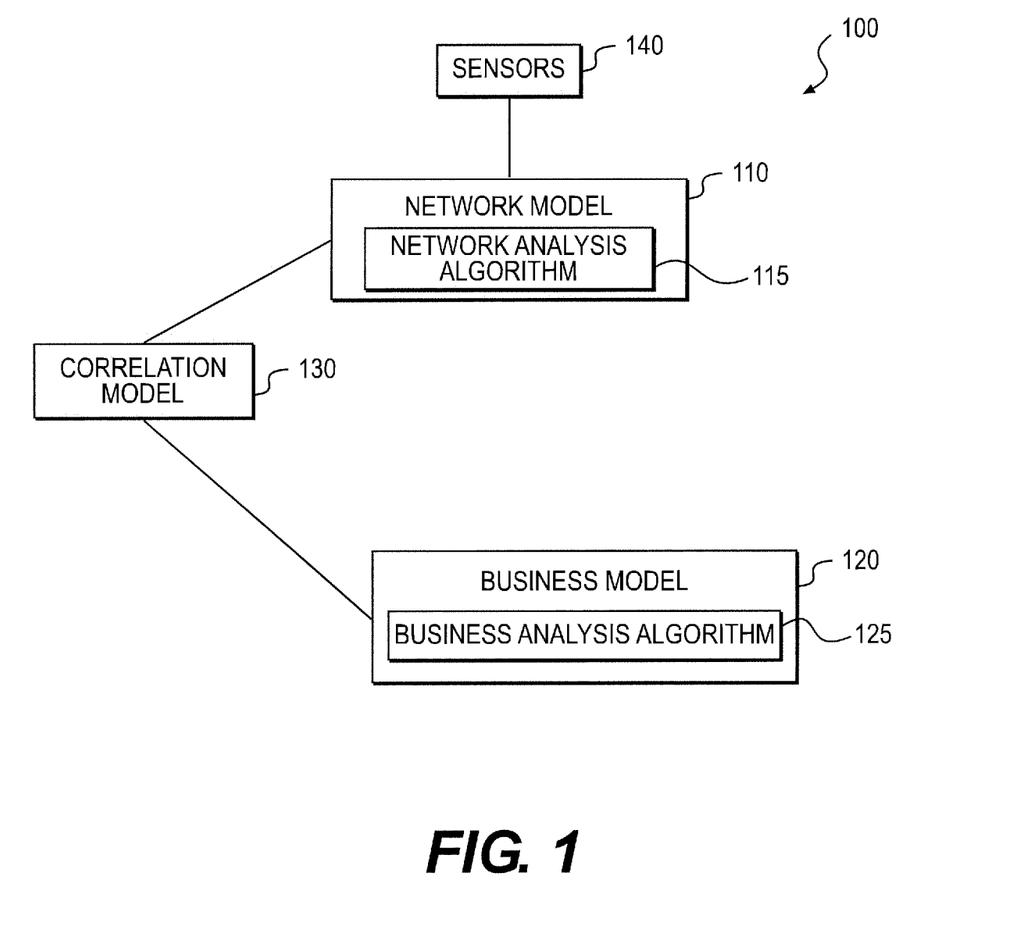
FIG. 1 illustrates an embodiment of a system for providing impact modeling and prediction of attacks on cyber targets (IMPACT)

FIG. 1 illustrates an embodiment of a system 100 for providing IMPACT. As noted above, embodiments of the system and method for providing IMPACT may be geared towards levels II and III in Endsley's situational awareness model, and rely on traditional network data sensors 140, such as network monitoring or intrusion detection systems, to make observations. The system for providing IMPACT may build a network model 110 (also referred to as a computer network model) based on these observations from the sensors 140 to describe the IT infrastructure. In an embodiment, the network model 110 may include an network analysis algorithm 115 that may find the maximum reach of a particular threat or attack on the network. A particular threat or attack may contain adversary capabilities (e.g., which exploits/payload an attacker has, or how much CPU/bandwidth the attacker has available) and a point of entry into the network. In addition to finding the maximum reach, the network analysis algorithm 115 may also find or enumerate different paths to obtain the maximum reach. This information can then be used to find weak or tactically significant points in the IT infrastructure. The network model 110 may be built using techniques and tools known to those of ordinary skill in the art, including but not limited to computer-implemented software tools for designing and building graphs. In an embodiment, a plugin API exists to accept updates from the sensors 140. This could be used to start with a minimal model and acquire the rest using updates, if the sensors 140 are sufficiently capable.

Referring again to FIG. 1, to provide a mission risk analysis for cyber attacks, an embodiment of the system 100 for providing IMPACT may create a business model 120 (also referred to as a business process model) to understand the organization's mission at an appropriate level of abstraction. In an embodiment, the business model 120 may include an business analysis algorithm 125 and may be modeled as a graph. The business model 120 may be constructed using techniques and tools known to those of ordinary skill in the art, including but not limited to computer-implemented software tools for designing and building graphs. The business model 120 may contain the overall mission of the organization, the contributing resources and procedures, and the dependencies between those. An embodiment of the system 100 for providing IMPACT may analyze these components to arrive at an overall efficiency score that assesses how efficient, based on the maximum efficiency, an organization operates under particular conditions.

Referring again to FIG. 1, for the analysis of mission risk from cyber attacks, the system for providing IMPACT may use a correlation model 130 to relate the network model 110 and the business model 120. The correlation model 130 associates business resources and procedures with IT resources that support them, such that if an IT resource becomes compromised or unavailable, its effect on the business function may be traced.

In an embodiment, the system 100 for providing IMPACT comprises a network model 110, a business model 120, and a correlation model 130.

Figure 2:
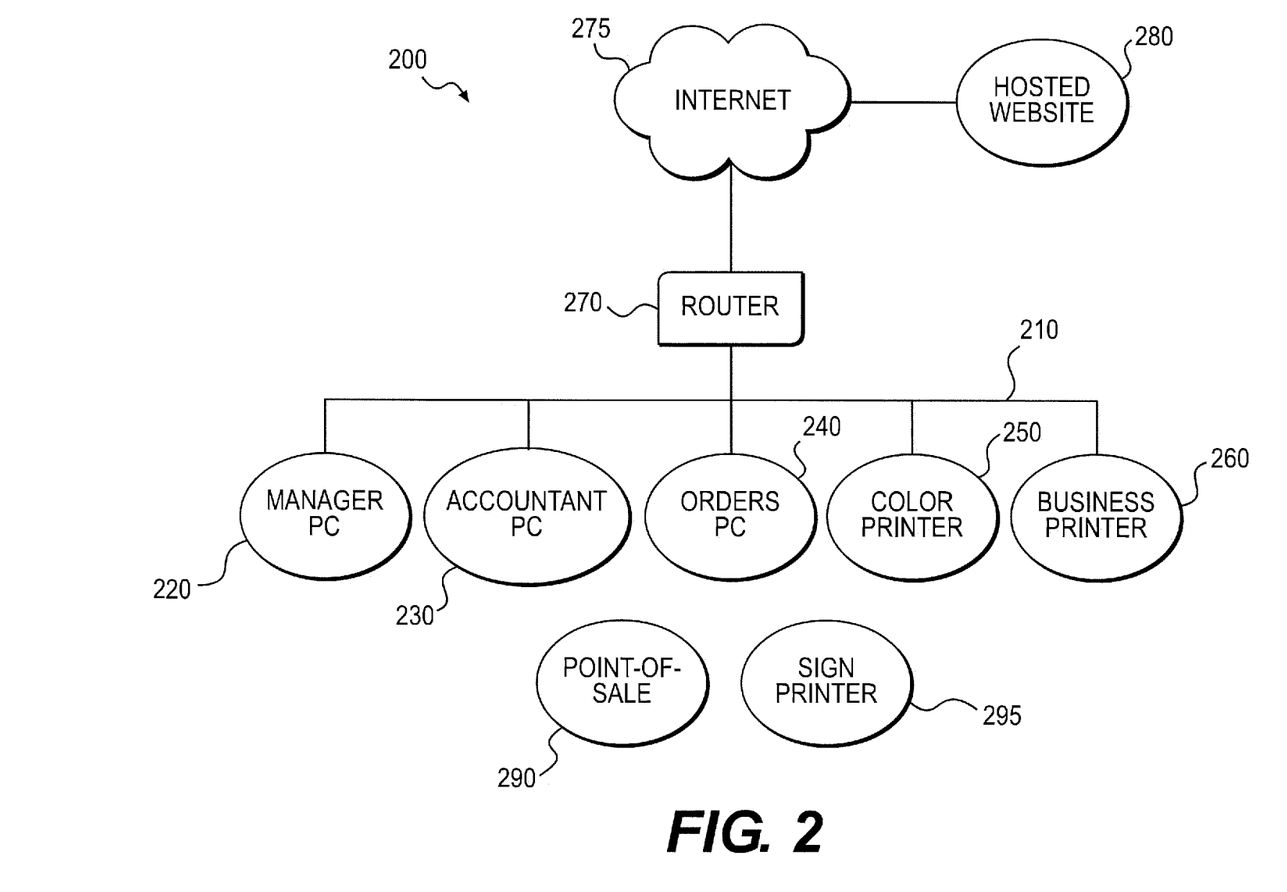
FIG. 2 illustrates an embodiment of a network model of the system for providing IMPACT of FIG. 1.

FIG. 2 shows an embodiment of a network model 200 for a printing business. In an embodiment, the network model 200 is similar to network representations found in many monitoring, management and visualization tools, and represents all relevant entities in the network, i.e., IT resources. An embodiment of the network model 200 has a local area network 210 that connects all IT resources (such as a manager personal computer (PC) 220, an accountant PC 230, an orders PC 240, a color printer 250, and a business printer 260) except a point-of-sale terminal 290 and a sign printer 295. The point-of-sale terminal 290 and the sign printer 295 may be unconnected because they may be too old to include local area network (LAN) connectivity. A router 270 may connect the IT resources to the Internet 275. Also connected to the Internet 275 is a hosted website 280, which is under different administrative control (by the hosting company), but still an important part of the business' IT infrastructure.

Augmenting the physical infrastructure representations are configurations and capabilities. Configurations may be the software or firmware loaded or operating on the IT resources, and may include version number and particular configuration information specific to a software or firmware item on an IT resource. Capabilities may include both physical characteristics and service characteristics.

Service capabilities may include the function of the IT resource, e.g., domain controller, file server, development platform. Service capabilities may be included in the network model 110 to accommodate multi-stage attacks that involve local infrastructure. Physical capabilities, e.g., central processing unit (CPU) type, memory capacity, etc, are unused in current network analysis algorithms 115, but may match against complex attack requirements in the future. Currently physical capabilities may be used to display detailed information about IT resources.

A phishing attack for internal passwords is described, for example, in Jacobsson, M. and Myers, S., [Phishing and Counter-Measures], John Wiley and Sons, Inc. (December 2006). An unsuspecting user may be redirected to a fake login screen and prompted to type in their user credentials. If the fake page is hosted outside the company, an application-level firewall may notice that traffic to an internal service should not leave the organization's network and hence drop the connection. In such a case, an attacker could try to set up a fake login page on a webserver inside the organization's network, gather credentials, and ex-filtrate them later. A webserver may be needed to host the fake login page. Using the service characteristics in an embodiment of the network model 110 of the system 100 for providing IMPACT, the network analysis algorithm 115 may check whether a webserver is present among the resources the attacker has access to and note whether internal phishing is a vulnerability an outside attacker may exploit in a particular scenario.

An embodiment of the network model 110 may also include logical groupings, such as subnets, and vulnerability and exploit information. Vulnerabilities and exploits each have requirements and capabilities. Vulnerability requirements are keyed to particular configuration items, and provide certain capabilities. For example, in a buffer overflow, the vulnerability capability may provide the maximum space for the buffer overflow. Exploit requirements may need to be matched with a vulnerability's capability to make it viable to use them together. Exploits may also provide capabilities, such as arbitrary code execution, privilege escalation, or reading or modifying an arbitrary file.

Figure 3:
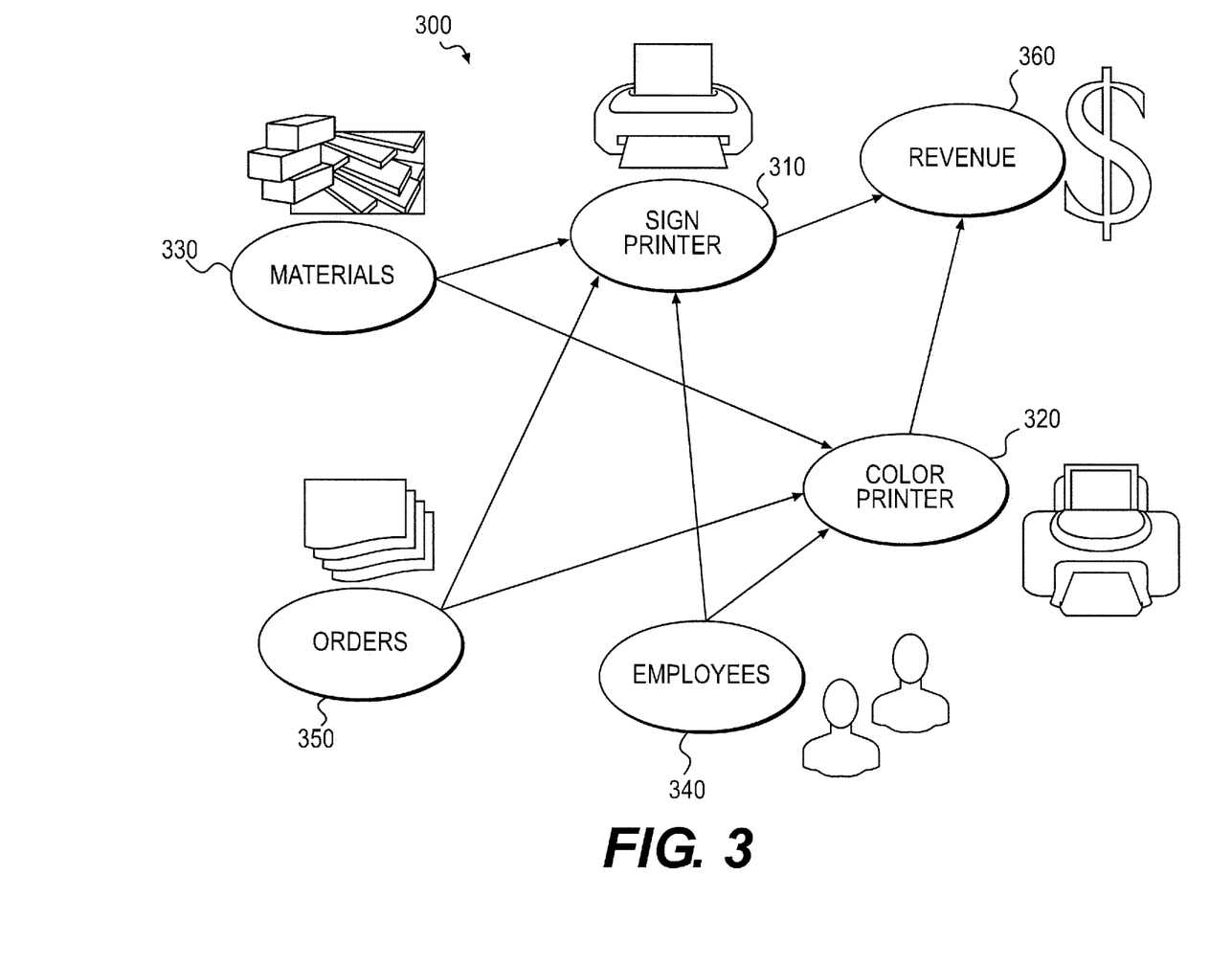
FIG. 3 illustrates an embodiment of a business model of the system for providing IMPACT of FIG. 1.

FIG. 3 illustrates an embodiment of a business model 300 of a printing business. The printing business makes signs and banners on its sign printer 310, and glossy brochures on its color printer 320. Both printers need materials 330 to process, employees 340 to operate them, and orders 350 to be fulfilled in order to generate revenue 360. These are the major business resources of the printing business model 300.

Resources in the business model may be connected by two kinds of relationships. The first relationship may be a causal or temporal dependency. For example, ink and paper (or other materials 330) have to be available at the printing business for anything to be printed. The second relationship may be that of an alternate resource or procedure. Organizations often have policies about how their processes are to be carried out. Mindful organizations have backup procedures or resources in case the normal policies cannot be carried out. Alternate resources or materials represent these types of backup procedures or resources.

Referring back to the printing business model 300 of FIG. 3, the standard procedure is to order new printing materials from a supplier over the Internet. When the Internet is unreachable, due to IT resource failure or otherwise, the backup procedure is to order the necessary materials by phone. Table 1 illustrates an exemplary correlation model with sample alternative procedures for the printing business model 300.

TABLE 1

Correlation Model with Sample Alternate Procedures

| Business Procedure | Required Resources | Efficiency |
|---|---|---|
| Order Materials | Order online: Management PC, router | 100% |
| | Order online: any PC, router | 80% |
| | Order by phone: <empty> | 60% |
| Online Orders | Order via website: website, Orders PC, router, business printer | 100% |
| | Order via website: website, any PC, router, business printer | 80% |
| | Order via website: website, any PC, router | 60% |
| Store Orders | Order via POS: POS, business printer | 100% |
| | Order via hand: <empty> | 60% |
| Pay employees | Direct deposit: Accounting PC, router | 100% |
| | Print cheques: Accounting PC, business printer | 80% |
| | Write cheques by hand: <empty> | 40% |

The primary resource or procedure is usually the best resource or procedure to accomplish its function in the organization. Alternate resources or procedures may be less efficient. An embodiment of the system 100 for providing IMPACT may provide an efficiency score. The primary resource or procedure is assumed to have 100% efficiency, alternates are assumed to have less. This assumption is a simplifying assumption, and may not be necessary. If there is no object with 100% efficiency for a given resource or procedure, then the organization's total efficiency under best conditions may be less than 100%. An embodiment of the system 100 for providing IMPACT may also accept more than one object among alternate resources or procedures with 100% efficiency.

The efficiency scores given in Table 1 are not representative, not based on any data, and were simply chosen for illustrative purposes. These efficiency scores are typically customized for an individual business model using methods and techniques familiar to a person of ordinary skill in the art. An exemplary process for deriving efficiency scores in an embodiment is as follows. For each process, determine the most efficient method of accomplishing it. This is the standard method, and by default has 100% efficiency. As an example paying employees may be most efficient by direct deposit, hence the direct deposit process has 100% efficiency. An alternate process may be to print checks and issue paychecks to employees. This method takes more effort than direct deposit, since checks have to be printed and distributed, which costs both time and resources. Suppose editing, reviewing, and submitting the salaries of employees for direct deposit usually takes 20 minutes, and printing and distributing them an additional 5 minutes. The cost of material (ink and paper, for example) seems negligible and will be ignored in this case but may be significant in another process. Now the less efficient process of printing and distributing takes 25 minutes and the more efficient direct deposit takes 20 minutes. The ratio between them shows how the efficient the alternate process is with respect to the default one. In this case, 20/25=0.8 or 80%, and hence an efficiency of 80% can be ascribed to the alternate process. For another exemplary process for determining efficiency scores, consider a process in which the primary variable cost is the cost of printer ink. Suppose there are different grades of ink that can be used in the printer, where the default grade for standard orders costs $1 per page printed. Suppose that when this ink has inadvertently run out, e.g. because the process to reorder ink is below maximum efficiency, the business' policy is to use a higher grade ink at no extra charge, and the higher grade ink costs $1.6 per page printed. Then the efficiency of using the higher grade ink in place of regular ink is 1/1.6=0.625 or 62.5%.

Each business model 120 in an embodiment has a root node that identifies the organization's mission. Referring back to FIG. 3, the revenue 360 is an exemplary mission. This is another simplifying assumption. Embodiments of the system 100 for providing IMPACT may not use profit (presumably a printing business' actual mission) in this example because the goal of the system 100 for providing IMPACT is not an optimization tool for an organization's operations, but to provide an analysis tool for cyber attack risk to an existing IT infrastructure, and that risk primarily affects revenue rather than profit. Other missions may be used. In another embodiment, the system 100 for providing IMPACT may be used to optimize IT infrastructure to minimize cyber attack risk.

As noted above, the correlation model 130 may be a mapping between the network model 110 and the business model 120 to provide the dependencies of business resources and procedures on IT resources. An embodiment of the correlation model 130 may be used in the business analysis algorithm 125 to check which business resources and procedures are affected by cyber attacks or other IT failures. An embodiment of the correlation model 130 may be designed to allow different kinds of relationships to be expressed. A business procedure may depend on zero or more IT resources, and when one resource is unavailable, the business procedure may be unavailable. A business procedure that depends on zero IT resources may be unaffected by cyber attacks. Similarly, an IT resource may support zero or more business procedures. An IT resource that supports zero business procedures may be a legitimate part of the infrastructure, or it may be a legacy or unused piece of equipment. An embodiment of the system 100 for providing IMPACT may discover IT resources that do not contribute to the organization's mission.

An embodiment of the system 100 for providing IMPACT may involve more complex dependencies, such as redundancies or graceful degradation. In the case of total redundancies, the business procedure may stay available until all redundant IT resources are compromised or have failed. Graceful degradation works similarly, except that the base efficiency of the business procedure is reduced by each successive failure in the dependencies.

Partial redundancy may be more difficult to model. When resources become partially unavailable, it is often not clear whether the crucial part is still available. For example, a distributed database may have some, but not all, data replicated across different servers, and it is difficult to determine whether a particular query's answer will rely on IT resources that are still available, or on others that have been compromised or failed. In these types of cases, the graceful degradation approach is a better alternative, possibly also in combination with a total redundancy component.

In short, embodiments of the system 100 for providing IMPACT may perform two types of analyses, a network analysis and a business analysis. The network analysis simulates an attack on the IT infrastructure, and identifies its weak and tactically significant points. The business analysis starts with a presumed cyber attack or other IT resource failure, and finds the overall business efficiency under that particular scenario. Iterating over all IT resources or even all subsets of IT resources may identify the most crucial IT resource or set of IT resources to the organization's mission. In combination, both models may assess the risk of a current cyber attack to the organization's mission, by first finding the vulnerabilities the attacker may exploit in the network model 110, and then assessing the impact of their unavailability in the business model 120.

In an embodiment, the system 100 for providing IMPACT may perform the network analysis using the network model 110 and information about vulnerabilities and exploits to assess the network risk stemming from a particular attack. An attacker is assumed to gain initial control of a particular IT resource. From there, the analysis is to check reachable IT resources, gather their configurations and vulnerabilities, and compare them to currently available tools (e.g., exploits or other capabilities), and determine whether all the requirements to exploit a particular vulnerability exist. If so, the identified IT resource is assumed to be compromised and added to the attacker's available IT resources and capabilities. This procedure is repeated until no additional IT resources may be compromised.

The result is the set of IT resources that may be compromised from a particular starting point, constrained by a particular set of exploits or capabilities. This analysis may be done for every IT resource in the network model, which will establish the set of compromisable IT resources from each starting resource. Additionally, an embodiment of the system 100 for providing IMPACT may make note of the attack paths, i.e., which IT resource led to a compromise of another IT resource. This may lead to the discovery of IT resources that are on many different attack paths, and hence may act as springboards for many other attacks once they are compromised. An embodiment of the system 100 for providing IMPACT may generate reports that show both metrics.

Referring back to the printing business network model 200 of FIG. 2, when a customer creates an order using the website 280 and attaches an executable file that masquerades as a compressed archive, which has a preinstalled malware wom1 program. An employee may run the masquerading executable file from the Orders PC 240, where orders from the website are checked. To assess the risk from this attack to the organization's mission, an embodiment of the system 100 for providing IMPACT may first run a network analysis to determine the extent of IT infrastructure that may be compromised from that particular starting point.

To start this analysis, an embodiment of the system 100 for providing IMPACT may assess the capabilities of the attack, i.e., which IT resources does it have, and which exploits does it have access to. The initial resource is the orders PC 240, where the malware starts executing. The available exploits may range from a particular set to all known exploits, or even an assumed 0-day exploit (as discussed below). Suppose the attack is aimed at the router 270, since it is usually only maintained by specialized staff, typically outsourced, and maintenance may only occur sporadically.

In this case the attack may have access to all known router exploits, perhaps even an unknown 0-day exploit. An embodiment of the system for providing IMPACT may compare these exploits to the IT resources reachable from the orders PC 240, and find a match in the router 270. The network algorithm may assume the attack succeeds, and adds the router 270 to the IT resources available for the attack. Since no other IT resources in the network model 110 should be running router software or firmware, the attack ends at the router 270.

The business analysis algorithm 125 may evaluate a business model 120 for its efficiency. Specifically, the business analysis algorithm 125 may start at the leaf nodes of the tree rooted at the root node, such as revenue 360, and selects from the leaf nodes the alternates with the highest available efficiency. Once the leaf nodes' efficiencies are determined they are propagated up the tree to the interior nodes, and finally to the root node. When a node depends on several other nodes, its children's efficiencies together combine to make up that node's efficiency score. An embodiment of the system 100 for providing IMPACT may offer a number of exemplary options in aggregating child node efficiencies:

low watermark (the lowest of the efficiencies);
arithmetic mean (the sum of the efficiencies divided by their number);
product (the product of the efficiencies);
geometric mean (the nth root of the product, where n is the number of children); and
weighted average (the sum of the efficiencies after multiplication by weights that add to 1).

To evaluate the business model 120 during a cyber attacks, an embodiment of the system 100 for providing IMPACT may add another step. Whenever a resource or procedure is selected in the business model 120, its requirements in the IT infrastructure may be checked for availability. If all requirements are available, the node is used in the analysis; if not, an alternate may need to be chosen. If no further alternate exists, a default node with an efficiency of 0% may be applied.

Referring back to the printing business network model 200 of FIG. 2, suppose that the orders PC 240 and the router 270 are compromised, and neither of them have redundancies or degrade gracefully. An embodiment of the system 100 for providing IMPACT may consult Table 1 for available business procedures. The online materials order procedures may be unavailable (as the router could intercept account number information or redirect payment authorization somewhere else), so ordering materials may become a 60% efficient process. Retrieving online orders may become completely unavailable, and may have 0% efficiency. Store order may remain unaffected at 100%, while employee payment may use check printing at 80% efficiency.

According to the exemplary printing business model 300 of FIG. 3, both the color printer 320 and the sign printer 310 may depend on the materials 330, the orders 350 (online and store) and the employees 340. If the arithmetic mean type of efficiency aggregation is applied, each of the printers may operate at $(60+0+100+80)/4=60\%$. The print business revenue may depend on both printers. Suppose the aggregation at the root node is multiplication. In that case printing business revenue is still $(0.6)\times(0.6)=0.36$ or 36% efficiency. In this case the efficiency cost of the router 270 and the orders PC 240 is 64% (100%-36%). In this example, the router 270 usage dominates the orders PC 240 usage in the business procedures, and hence does not contribute separately to the efficiency cost. In other words, the efficiency of a compromised router alone is also 64%.

Further (i.e., repeated) usage of the system 100 for providing IMPACT may yield other benefits, including exposing other types of relationships, such as efficiency cost by subgroups of compromised IT resources, or reducing the set to the smallest equivalent. Repeated runs of the business analysis algorithm with different starting assumptions may yield different results, and whether or not the results differ may provide additional information. As in the example of the printing business, a business analysis of a compromised router 270 and a compromised orders PC 240 produces a 64% efficiency drop. If a business analysis of only a compromised router 270 also produces a 64% efficiency drop, this indicates that if the router 270 is compromised, the printing business need not worry about the orders PC 240 because the risk from a compromised orders PC 240 is insignificant compared to that of a compromised router 270. Once the router 270 problem is fixed it may become worthwhile to worry about the orders PC 240; but while the router 270 is compromised, the compromised router 270 is a greater risk to the mission than the orders PC 240. Similarly, if a business analysis is performed for compromised object A and compromised object B, and each on its own has a 10% efficiency drop, but together (i.e., both are compromised together) they have a 40% efficiency drop, this indicates that object A and object B provide some kind of redundancy for each other where the full effect only applies if both are compromised. If object A has a 20% drop by itself and object B has a 20% drop by itself and both objects together have a 20% drop, this indicates that one of them is dependent on the other. Repeated runs of the business analysis algorithm 125 may allow an organization to uncover some of these relationships.

Another embodiment of the system 100 for providing IMPACT may use system dynamics to provide business analysis. System dynamics is a method for modeling complex systems (including IT networks and business processes) with interacting components, feedback loops, and delays. System dynamics was developed at MIT in the 1950s by Professor Jay Forrester. An embodiment of the system 100 for providing IMPACT may use a customized system dynamics model to represent the network, correlation and business models as a unified model, which contains business processes and IT resources and embodies the influence of business processes on the organizational mission, as well as the dependence of the business processes on the IT resources. A business analysis may then be conducted by iterating through the customized system dynamics model according to the rules of system dynamics.

As a result of the analyses described above, an organization may gain cyber awareness. The network analysis may show which IT resources are of tactical advantage in a cyber attack. The business analysis may show how a particular cyber attack or other IT failure may affect an organization's ability to accomplish its mission.

These analyses may be applied as a planning tool ahead of any incidents, or in situ as a decision aid. An embodiment of the system 100 for providing IMPACT may provide a planning tool to allow evaluation of current and potential IT infrastructure in terms of the potential for attack that they offer possible attackers (network analysis) and in terms of risk posed to the organization's mission (business analysis).

The network analysis helps network administrators prioritize their attention, as it identifies IT resources that may be of high utility to possible attackers. A number of reasons may cause an IT resource to be identified as high network risk, and it may be dealt with in different ways, e.g., by making it a high priority to keep the IT resource current with all patches and configuration recommendations, by changing its location in the network topology, or by splitting the functions among several different IT resources.

The business analysis helps business analysts and network architects find weaknesses in their IT strategy, as it identifies IT resources whose absence or lack of trustworthiness may cause large disruption to the organization's mission. After a resource has been identified as high mission risk, a network architect or business analyst may take steps to mitigate the situation, e.g., by building redundant services that stay available even when some parts are compromised, or by devising alternate means (and IT resources) by which the same mission goals may be accomplished.

As a decision aid during an incident, an embodiment of the system 100 for providing IMPACT may analyze the options a current attacker has (based on best current knowledge) and project the network and mission risk. Additionally, an embodiment of the system 100 for providing IMPACT may analyze and project the impact of defensive measures on both the attacker's options inside the network and the effects on the organization's mission ability.

New vulnerabilities continue to be found. While new vulnerabilities are sometimes brought to the attention of the organization maintaining the software or IT resources (e.g., appliance, router, and printer), often they are not and instead are used to craft new attacks that are very difficult to plan for using current IT security tools. This issue has generated significant interest in capabilities to deal with 0-day vulnerabilities. An embodiment of the system 100 for providing IMPACT may have the ability to assess the potential impact of a particular 0-day vulnerability.

An embodiment of the network model 110 may include a set of vulnerabilities and exploits that are based on current knowledge and need to be maintained to be kept up to date. However, it is possible to add a vulnerability that is not known to exist and re-run various analyses on the resulting configuration. If, for example, a network administrator wants to assess the risk of a new vulnerability in SQL Server or Berkeley Internet name domain (BIND), the network administrator may create such a vulnerability in the network model, and all further analyses may assume that such a vulnerability exists and project the impact onto the network model 110 and the business model 120.

Similarly, if analysis of a current attack leads to the discovery of a previously unknown vulnerability, the network model 110 may be adapted and analyses re-run to assess the risk posed by the new vulnerability.

IT infrastructure risk has been extensively studied, though it is far from a solved problem. An embodiment of the system 100 for providing IMPACT may tie this IT infrastructure risk to the underlying reason for the existence of the IT infrastructure—namely the organization's mission. An embodiment of the system 100 for providing IMPACT may allow for the definition of the organization's mission, its dependence on IT infrastructure, and the analysis of the mission risk that comes from this dependence. An embodiment of the system 100 for providing IMPACT may be used as a planning tool to evaluate and optimize an IT infrastructure, and as a decision aid to evaluate potential action under an attack.

Figure 4:
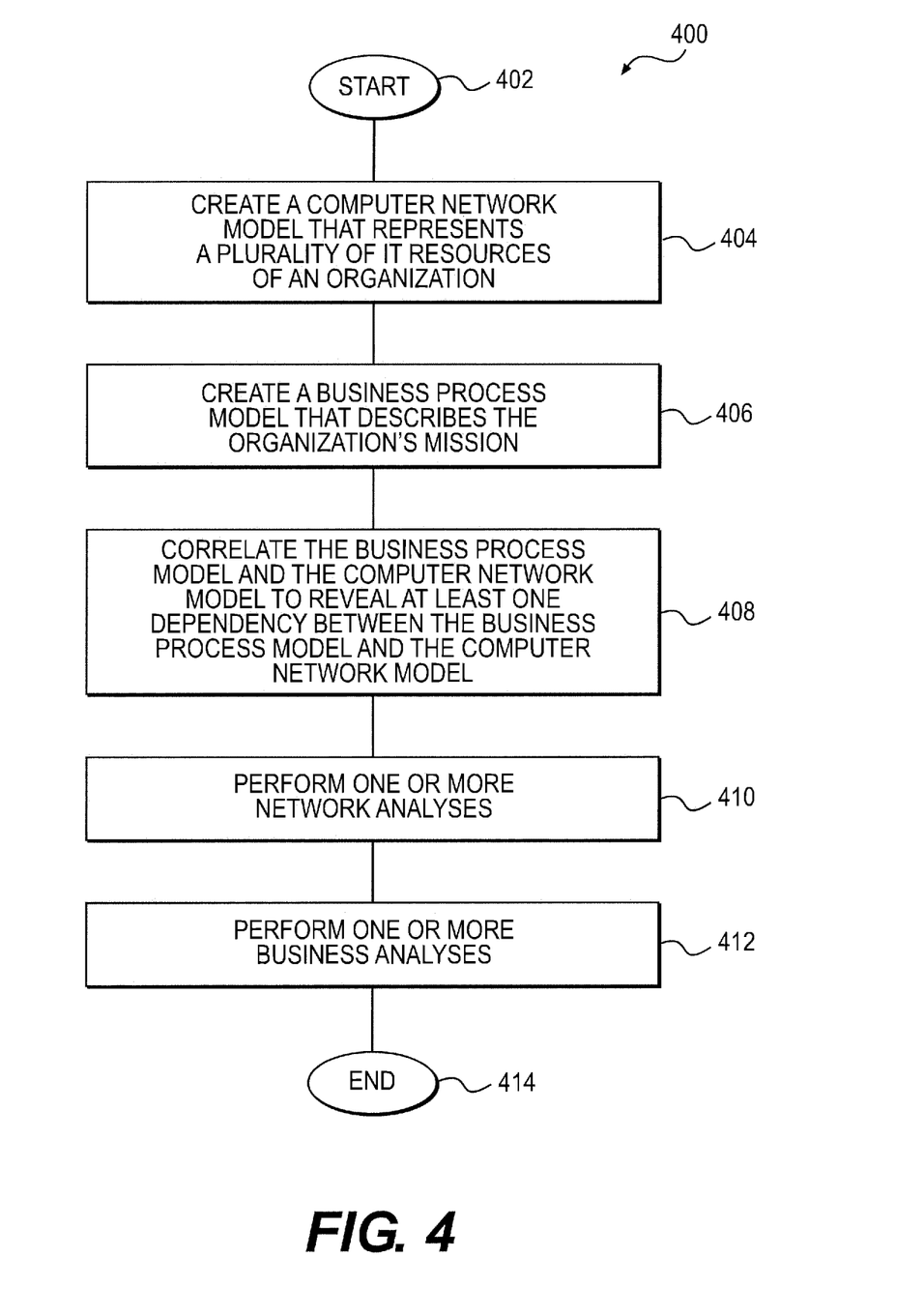
FIG. 4 is a flow chart illustrating an embodiment of a method for providing IMPACT.

FIG. 4 is a flow chart illustrating an embodiment of a method 400 for providing IMPACT. The method 400 starts 402 by creating a computer network model that represents a plurality of IT resources of an organization (block 404). The computer network model includes a network analysis algorithm that analyzes observations obtained from one or more sensors and identifies points that are vulnerable (for example, easily compromised or having many vulnerabilities) and/or tactically significant (for example, that enable or serve as a launching point for many additional attacks), as well as the maximum reach of a particular threat or attack in the network and the paths by which this reach can be attained. The method 400 then creates a business process model that represents a plurality of business processes and resources that describe the organization's mission (block 406). In other embodiments, step 406 may precede step 404. The business process model includes a business analysis algorithm that analyzes a plurality of business resources and procedures of the organization. The method 400 further correlates the business process model and the computer network model to reveal at least one dependency between the business process model and the computer network model (block 408). The method 400 further performs one or more network analyses to generate network analysis results (block 410) and performs one or more business analyses to generate business analysis results (block 412). The method 400 may end at 414.

Figure 5:
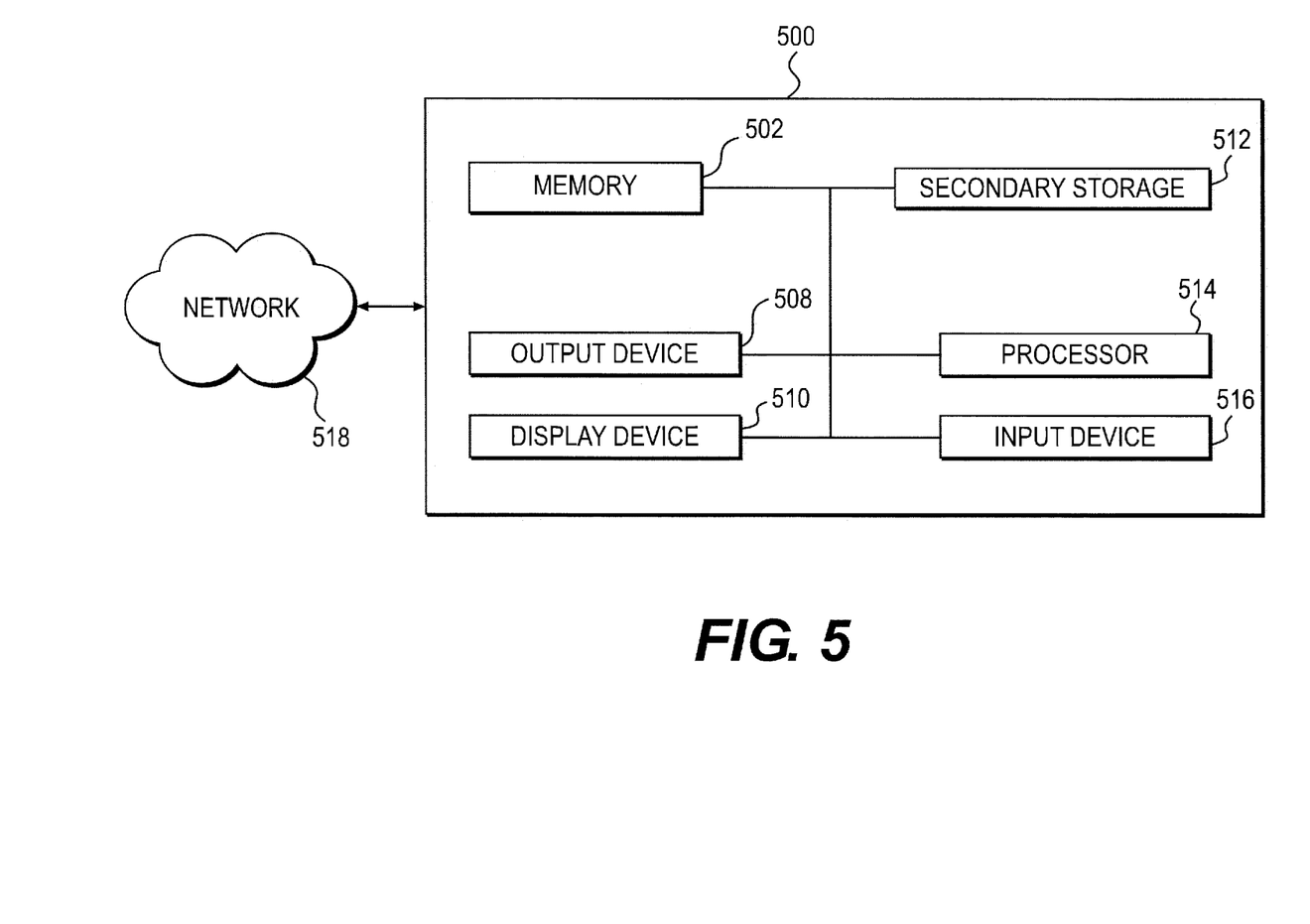
FIG. 5 is a block diagram illustrating exemplary hardware components for implementing embodiments of the system and method for providing IMPACT.

With reference now to FIG. 5, shown is a block diagram illustrating exemplary hardware components for implementing embodiments of the system and method for providing IMPACT. Computer system 500 may include and execute one or more programs to perform functions described herein, including steps of method 400 described above. Likewise, a mobile device which includes some of the same components of computer system 500 may perform steps of method 400 described above. Computer system 500 may connect with network 518, e.g., Internet, or other network, to receive inquires, obtain data, and transmit information and incentives as described above.

Computer system 500 typically includes a memory 502, a secondary storage device 512, and a processor 514. Computer system 500 may also include a plurality of processors 514 and be configured as a plurality of, e.g., bladed servers, or other known server configurations. Computer system 500 may also include an input device 516, a display device 510, and an output device 508.

Secondary storage device 512 and memory 502 may include any media with sufficient capacity to store the software code and data structures (including the business model and network model) described herein. Memory 502 may include RAM or similar types of memory. Memory 502 may also include an operating system and one or more modules of software including coded instructions stored in memory or other tangible media that is executed by one or more processors 514. Exemplary software modules in an embodiment include a graph software package capable of creating a graph data structure, populating the graph with data elements, and operating on the graph. In an embodiment the graph structure is implemented in a relational data base management system and the graph software package includes a SQL database. Secondary storage device 512 may include a hard disk drive, floppy disk drive, CD-ROM drive, or other types of non-volatile data storage.

Processor 514 executes the application(s), including the coded instructions, stored in memory 502 or secondary storage 512, or received from the Internet or other network 518. The processing by processor 514 may be implemented in software, such as software modules, for execution by computers or other machines. These applications preferably include instructions executable to perform the functions and methods described above and illustrated in the Figures herein. The applications preferably provide GUIs through which users may view and interact with the application(s).

Also, as noted, processor 514 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system 100.

Input device 516 may include any device for entering information into computer system 500, such as a touchscreen, keyboard, mouse, cursor-control device, microphone, digital camera, video recorder or camcorder. The input device 516 may be used to enter information into GUIs during performance of the methods described above. Display device 510 may include any type of device for presenting visual information such as, for example, a computer monitor or flat-screen display (or mobile device screen). Output device 508 may include any type of device for presenting a hard copy of information, such as a printer, and other types of output devices include speakers or any device for providing information in audio form.

Examples of computer system 500 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 500 is shown in detail, system 100 may use multiple computer systems or servers as necessary or desired to support the users and may also use back-up or redundant servers to prevent network downtime in the event of a failure of a particular server. In addition, although computer system 500 is depicted with various components, one skilled in the art will appreciate that the server may contain additional or different components. In addition, although aspects of an implementation consistent with the above are described as being stored in memory, one skilled in the art will appreciate that these aspects may also be stored on or read from other types of computer program products or computer-readable media, such as secondary storage devices, including hard disks, floppy disks, or CD-ROM; or other forms of RAM or ROM. The computer-readable media may include instructions for controlling a computer system, computer system 500, to perform a particular method, such as methods described above.

In other embodiments the system may be implemented using other computer architectures (for example, a client/server type architecture, a mainframe system with terminals, an ASP model, a peer to peer model, and the like) and other networks (for example, a local area network, the internet, a telephone network, a wireless network, a mobile phone network, and the like), and those other implementations are within the scope of the invention since the invention is not limited to any particular computer architecture or network. Any embodiment of the invention that has utility in the real world would be so complex as to require implementation on a computer such as shown in FIG. 5.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A computerized system linked with a plurality of information technology (IT) resources of an organization to access risk to the IT resources of the organization and to provide impact modeling and prediction of attacks on cyber targets (IMPACT) in a network of the organization, comprising:

at least one network data sensor that makes observations on the network, wherein the at least one network data sensor includes an intrusion detection system;

a plugin application programing interface (API) to accept updates from the at least one network data sensor;

at least one processor; and at least one non-transitory computer readable medium including instructions that cause the at least one processor to perform operations comprising:

creating a computer network model based on the observations from the at least one network data sensor, wherein the computer network model incorporates network status information and is configured to describe IT infrastructure of the organization and vulnerabilities of the IT infrastructure of the organization based on the observations from the at least one network data sensor, wherein the computer network model includes a network analysis algorithm that is executed to find reachable IT resources by a particular threat or attack on the network, and is linked with the IT resources of the organization through a local area network or an internet;

augmenting infrastructure representations including configurations and capabilities of the IT resources of the organization, wherein the configurations include firmware loaded on the IT resources and the capabilities include functions of the IT resources;

creating a business process model configured to perform an analysis of the organization's mission, business resources, and business procedures; and creating a correlation model which is a mapping between the computer network model and the business process model to provide dependencies of the business resources and the business procedures on the IT resources, wherein the at least one non-transitory computer readable medium includes a program code that causes the at least one processor to perform additional operations configured:

to determine one or more dependencies between the business resources and the procedures with the IT resources;

to check which business resources and procedures are affected by cyberattacks or other IT failures;

to identify points in the local area network that are vulnerable or tactically significant;

to determine attack paths and construct protection trees using the attack paths;

to determine affected components of the business process model based on the one or more dependencies;

to determine a cost-benefit metric based on the affected components and the corresponding protection tree; and to select at least one priority for protection against attack from among the plurality of IT resources and the components of the business process model based on one or more determined cost-benefit metrics, wherein the selected at least one priority for protection is used to identify tactics for a defender to achieve maximal protection value.

2. The system of claim 1, wherein the one or more dependencies between the plurality of IT resources and components of the business process model comprise a loss of a particular component of the business process model due to unavailability of one or more IT resources.

3. The system of claim 2, wherein:
the particular component is a business procedure; and
the loss comprises difference in efficiencies of the business procedure and an alternate business procedure unaffected by the unavailability of the one or more IT resources.

4. The system of claim 1, wherein the cost-benefit metric comprises a benefit metric related to avoidance of the loss in efficiency and a cost metric related to the corresponding protection trees.

5. The system of claim 1, wherein the one or more dependencies between the plurality of IT resources and components of the business process model comprise a loss of a plurality of business process model components due to unavailability of a particular one of the affected IT resources comprising an one of the attack paths.

6. The system of claim 1, wherein the at least one processor is configured to execute the program code to cause the system to:
for each particular one of the IT resources affected by at least one of the one or more attack paths, determine a total loss in efficiency due to unavailability of the particular one of the IT resources in all of the attack paths; and
based on the total loss in efficiency, select at least one of the plurality of the IT resources as a priority for protection against attack.

7. The system of claim 6, wherein the at least one processor is configured to execute the program code that causes the system to identify one or more of the plurality of IT resources that do not contribute to the organization's mission based on priority list.

8. The system of claim 6, wherein the at least one processor is configured to execute the program code to cause the system to:
select one or more of the plurality of IT resources; and
determine the one or more attack paths based on the selected the one or more IT resources.

9. The system of claim 6, wherein the at least one processor is configured to execute the program code to cause the system to:
select a plurality of resource subgroups, each of the resource subgroup comprising one or more of the plurality of IT resources; and
for each resource subgroup,
determine a corresponding subgroup of the attack paths; and
determine a corresponding subgroup cost-benefit metric based on the cost-benefit metrics determined for the individual attack paths comprising the attack path subgroup.

10. The system of claim 9, wherein the plurality of resource subgroups comprises first and second resource subgroups, the second resource subgroup comprising a subset of the plurality of IT resources comprising the first resource subgroup.

11. The system of claim 6, wherein the at least one processor is configured to execute the program code to cause the system to:
select one or more components of the business process model; and
determine the one or more of the attack paths further based on the selected one or more components and the one or more dependencies.

12. The system of claim 1, wherein determining one or more points in the computer network that are vulnerable or tactically significant comprises determining a network graph based on the observations obtained from the one or more sensors.

13. The system of claim 1, wherein determining one or more points in the computer network that are vulnerable or tactically significant comprises simulating an attack on the plurality of IT resources.

14. The system of claim 1, wherein the capabilities of the IT resources includes service capabilities, physical capabilities, logical groupings that include subnets, and vulnerability and exploit information.

15. The system of claim 1, wherein each of the attack paths comprises a particular starting point in the plurality of IT resources and one or more exploits.

16. The system of claim 2, wherein:
the business process model comprises a tree structure comprising a root node, one or more interior nodes, and one or more leaf nodes representing business process model components; and
determining one or more dependencies between affected IT resources and components of the business process model includes:
selecting from the leaf nodes alternatives with the highest available efficiency; and
propagating the leaf nodes' efficiencies to the root node via the interior nodes.

17. The system of claim 16, wherein determining one or more dependencies between the affected IT resources and components of the business process model further comprises aggregating child node efficiencies according to one or more of a low watermark method, an arithmetic mean method, a product method, a geometric mean method, and a weighted average method.

18. The system of claim 1, wherein the one or more dependencies comprises one or more traceable associations between the components of the business process model and the plurality of IT resources.

19. The system of claim 1, wherein the business process model comprises a sign printer, a color printer with glossy brochures, materials to process the sign printer and the color printer, employees to operate the materials and the sign printer and the color printer, and orders to be fulfilled to generate revenue.

20. The system of claim 1, wherein the IT resources of the organization comprises one or more selected from a group consisting of computers, servers, workstations, printers, routers, appliances and smart phones.

* * * * *